Jan. 1, 1935.  L. H. L'HOLLIER  1,986,637
METHOD OF MAKING MOLDED RUBBER ARTICLES
Filed June 21, 1933  2 Sheets—Sheet 1

Inventor
Leslie H. L'Hollier
By Eakin & Avery
Attys.

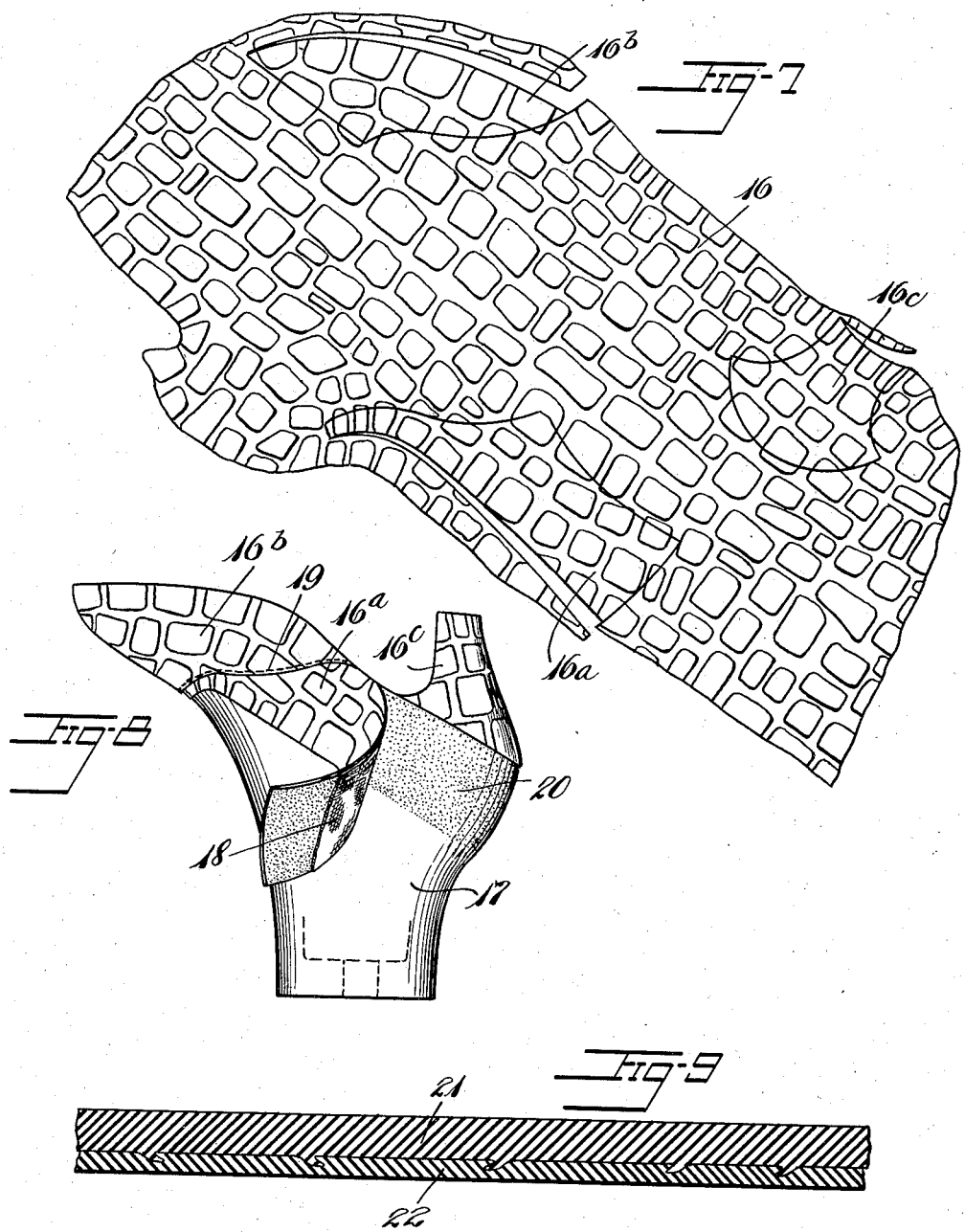

Patented Jan. 1, 1935

1,986,637

UNITED STATES PATENT OFFICE 1,986,637

METHOD OF MAKING MOLDED RUBBER ARTICLES

Leslie H. L'Hollier, Waltham, Mass., assignor to Hood Rubber Company, Inc., Watertown, Mass., a corporation of Delaware Application June 21, 1933, Serial No. 676,869

5 Claims. (Cl. 18—61)

This invention relates to procedure for making articles having molded rubber surfaces, such for example as rubber shoes, the surfaces of which are formed in imitation of leather, fabric or other surface designs. This invention is an improvement upon the subject matter of the copending application of V. H. Bodle and E. B. Newton, Serial No. 598,418, filed March 12, 1932, for Method of making a rubber article having a molded outer surface; the copending application of A. A. Glidden, Serial No. 603,812, filed April 7, 1932, for Molded rubber article and process of making the same; and my copending application, Serial No. 604,909, filed April 13, 1932, for Molded rubber article and method of making the same.

Objects of the invention are to provide for reproducing the desired design in large numbers of rubber articles; and to provide a large number of reproducing matrices and forms even in the case where the material of the original surface is of an easily destructible nature and can withstand only a comparatively few direct impressions, as where the original surface is of leather and a coagulant having leather-deteriorating properties is used in the rubber molding process.

Related objects are to provide for convenience, rapidity and economy in the reproducing process and to maintain a high degree of fidelity in reproducing the details of design of the original surface.

The invention makes possible the repeated use of the design of a comparatively small original surface over a larger surface area of the final article, and the repeated use of the same design upon areas of pairs of such articles as shoes, this being of importance especially where the original surface is that of a small reptile skin which is difficult if not impossible to match very closely in another skin, no two skins being exactly alike. This constitutes a considerable advantage over procedures wherein the final articles, or even molding forms, are built up directly from such skins, and wherein considerable waste necessarily results from the expedient of approximately matching the skins, especially as it often happens that an otherwise desirable skin is partly blemished by the presence of wound marks or other malformation. These disadvantages are largely overcome by the present invention.

In the accompanying drawings:

Figs. 1 to 6, inclusive, are enlarged cross-sections of elements used in successive stages of the procedure according to the invention in its preferred form; Fig. 1 illustrating a reptile skin, such as that of an alligator, whose surface design it is desired to reproduce; Fig. 2 a soft negative matrix; Fig. 3 a positive electrotype associated with the soft negative matrix; Fig. 4 the detached positive electrotype; Fig. 5 a hard negative matrix in association with the positive electrotype and Fig. 6 a positive form-building sheet of rubber in association with the hard negative matrix.

Fig. 7 is a plan view of the molded form-building sheet.

Fig. 8 is an elevation of a shoe support having partly built upon it a positive article-forming matrix.

Fig. 9 is an enlarged cross-section of a sheet of form-building rubber in association with a negative matrix having an undercut design illustrating a modification of the procedure.

Figure 1:

Referring to the drawings, a negative matrix 12 is formed upon an original surface serving as a positive matrix, the original surface illustrated being that of an alligator skin 10 having irregular grooves 11, 11 in its surface. The negative matrix 12 is preferably of unvulcanized rubber composition, which is soft, and is preferably formed by depositing the rubber from a dispersion of the latter upon the skin 10 with the aid of a coagulant, although preferably a preliminary deposit is formed upon the skin without a coagulant in order to provide a rubber surface accurately conforming to the minute details of the design. After at least a partial drying, the unvulcanized rubber 12 is sufficiently tenacious to be removed from the skin and handled without permanent distortion of its surface. Preferably without vulcanizing the soft negative matrix 12 or subjecting it to any other treatment that might malform its surface, it is utilized to make a positive electrotype 13 by any suitable process for producing electrotypes. Before the sheet 13 of deposited metal is removed from the soft matrix 12 the electro-deposited metal may be provided with a reinforcing back 14, also of metal, such as lead.

Figure 4:
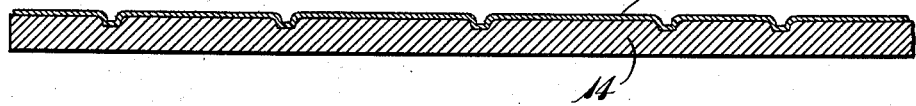
Figure 5:
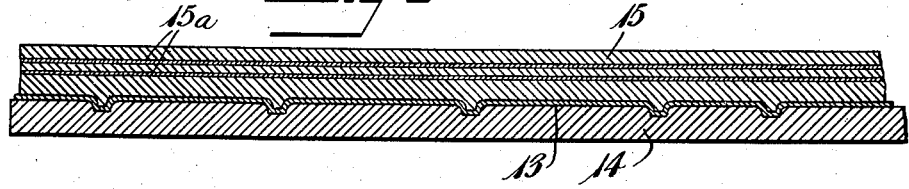

The positive electrotype is then removed from the soft matrix and is as shown in Fig. 4, providing a permanent and rugged reproduction of the original surface design.

From the electrotype there is formed a negative matrix 15, of any suitable material, such as a phenolic condensate composition or vulcanized rubber, which is desirably hard and reinforced, as with fabric plies 15ª, for the sake of ruggedness, and is highly resistant to the corrosive action of coagulants which may be used subsequently in molding rubber against it. This negative matrix 15 may be formed by pressure molding the composition against the electrotype, or it may be deposited from a liquid dispersion of the composition upon the electrotype, and it is preferably hardened while in contact with the electrotype, as by heating or vulcanizing, according to the composition used.

Figure 6:
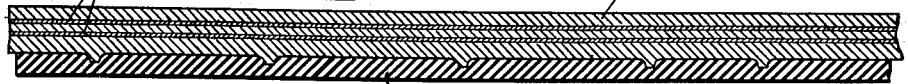

The negative matrix 15 is then removed from the electrotype and is used as a mold to form sheet rubber 16 (Fig. 6) with a positive surface design. The rubber is molded against the matrix preferably by deposition of the rubber from a liquid dispersion of the same with the aid of a coagulant. The composition of the matrix 15, being highly resistant to wear and to the action of such ingredients as acids commonly used in coagulants, a large number of rubber sheets may be formed from the matrix by the dispersion deposition process in faithful reproduction of the surface of the original skin.

The sheet rubber 16 is removed from the matrix 15 and may be built directly into final articles if desired, but in order to produce large numbers of the articles in virtually exact reproduction and to facilitate such procedure and avoid waste, it is preferred to make one or more master forms from the sheet rubber 16 and to produce the final articles in reproduction of the shape and surface design of the master form.

For this purpose, the sheet 16 is dried, if it is made by deposition from a liquid dispersion of the rubber, and it may, though not necessarily, be vulcanized. A fabric backing 18 may be adhered to the sheet to reinforce it, this fabric preferably being of such weave as to permit some stretching of the sheet in subsequently distorting it to form shape.

It is then cut in suitable shapes, such as the shoe parts 16a, 16b, and 16c shown in Fig. 7, and these parts are then assembled upon a support 17 (Fig. 8) so as to present an outer surface corresponding to that desired in the final articles. As the sheet material is distortable and also stretchable it may be curved to the shape of the form smoothly and without wrinkles. The parts may be sewn together by stitching 19, precisely as parts of leather shoes are sewn together, or the parts may be held in association with one another simply by means of an adhesive 20 holding them onto the support or onto each other. Inasmuch as the sheet 16 can be duplicated many times, the builder of the master form can if desired utilize a choice portion of the design on several parts of the same form, and in the case of such articles as shoes, on the two master forms for the pair, instead of having to resort to the expedient of approximate matching, which he would have to do if the forms were to be built up from original skins. Also, an error in cutting the sheets 16, in the case of a rare design, would not be fatal as it would were the original skin being cut.

The built-up master form is used to produce intermediate forms from which the final articles are produced, all preferably of rubber formed by the dispersion-dipping method disclosed in my copending application Serial No. 604,909, filed April 13, 1932. Upon the master form, which is a male-positive, is deposited a female-negative. The latter, when removed and turned inside out, constitutes a male-negative, and upon this is deposited a female-positive, which, when removed and turned inside out, presents the male-positive outer surface of the final article.

In the case of footwear, such parts as a lining, reinforcement, and sole and heel parts may be applied during the process, and the article vulcanized in open heat upon a support as disclosed in said copending application.

Owing to the great multiplicity of forms that can be conveniently produced with surface designs in virtually exact reproduction of the original surfaces, the procedure of the present invention is well suited to large scale production, and as the cost of the material having the original design is divided among a large number of final articles, rare and costly skins and other designed materials can be used with comparatively low cost for the design in the final article.

Figure 2:
Figure 3:
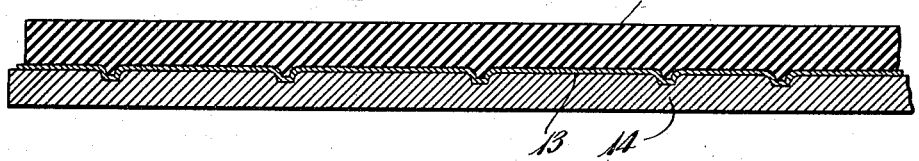

Occasionally it is desired to reproduce the design of a reptile skin or other surface having deeply undercut recesses in the surface such as to render it difficult, if not impossible, to withdraw a non-resilient material molded against it without injuring one or the other of the surfaces. It has been found that good results in such cases may be obtained by forming from the original surface a soft rubber negative matrix, as in the step of the above described procedure corresponding to Fig. 2, and then, instead of forming an electrotype from such soft negative matrix, using it directly to form a positive form-building sheet, as illustrated in Fig. 9, the soft negative matrix being indicated at 21, and the sheet rubber which is formed against it being designated 22. The rubber sheet 22 may be formed upon the matrix 21 by depositing the rubber from a dispersion with the aid of a coagulant as described for the forming of sheets 16, and may likewise be fabric backed before being removed from the matrix for cutting and assembly into the master form. As both the matrix 21 and the sheet 22 are of resilient rubber, separation of the two without injury to the surfaces, is facilitated, even with pronounced undercuts in the design.

If desired, the matrix 21 may be of hard rubber composition which is removed from the matrix in a soft state and is then vulcanized. With this, the yieldability and resilience of the rubber layer 22 is relied upon for safe removal of it from the matrix without damage resulting from undercut recesses in the design.

While by this procedure the number of sheets 22 possible to make is not as great as in the procedure hereinbefore described where the original design is made more nearly permanent by the electrotype and the hard matrices, yet the number of reproductions possible is considerably greater than in the case where the form is built directly from the original material, and this procedure has the advantages also of convenience, speed and economy, and of giving the builder of the master-form considerable freedom in using choice portions of a design on several parts of a single or pair of master forms without having to resort to the expedient of approximate matching of skins.

I claim:

1. The method of producing a molded rubber article which comprises molding a layer of rubber against an element of which the surface configuration is to be reproduced in rubber to produce a negative rubber matrix, producing by means of said matrix a sheet of rubber having molded in its surface a reproduction of said configuration, shaping in contoured form upon a form-support a plurality of pieces of rubber including at least one piece of the molded rubber sheet to provide a matrix form, and molding a layer of rubber against said form.

2. The method of producing a molded rubber article which comprises molding a layer of rubber against an element of which the surface configuration is to be reproduced in rubber, to produce a negative rubber matrix, then while the rubber of said matrix is yet soft and unvulcanized producing an electrotype of its face, and by means of said electrotype producing a layer of plastic material having molded in its face a reproduction of said configuration.

3. The method of making a contoured rubber article having as a surface design a reproduction of the surface design of a chosen article which comprises producing in a flexible sheet of plastic material by molding a reproduction of the surface design of the article, shaping a plurality of pieces of flexible sheet material including at least one piece of said molded plastic material in contoured form upon an internal form-support to provide a form matrix, and from said form-matrix producing by molding in a layer of rubber the final contoured article having in its surface a reproduction of the design.

4. The method of making a contoured rubber article having as a surface design a reproduction of the surface design of a chosen article which comprises producing in rubber in sheet form by molding a reproduction of the surface design of the article, shaping a plurality of pieces of rubber including at least one piece of said molded rubber in contoured form upon an internal form-support to provide a form matrix, and from said form-matrix producing by molding in a layer of rubber the final contoured article having in its surface a reproduction of the design.

5. The method of making negative matrix forms for molding contoured rubber articles with a surface design reproduced from a chosen article which comprises producing in a flexible sheet of plastic material a positive reproduction of the surface design of the article, shaping said material in contoured form upon a form-support to provide a positive, contoured matrix form, and molding a plurality of contoured negative forms from the said positive form.

LESLIE H. L'HOLLIER.